Oct. 31, 1933.  C. H. PORTER  1,932,600
SOUND PICTURE PROJECTION
Filed July 31, 1929   3 Sheets-Sheet 1
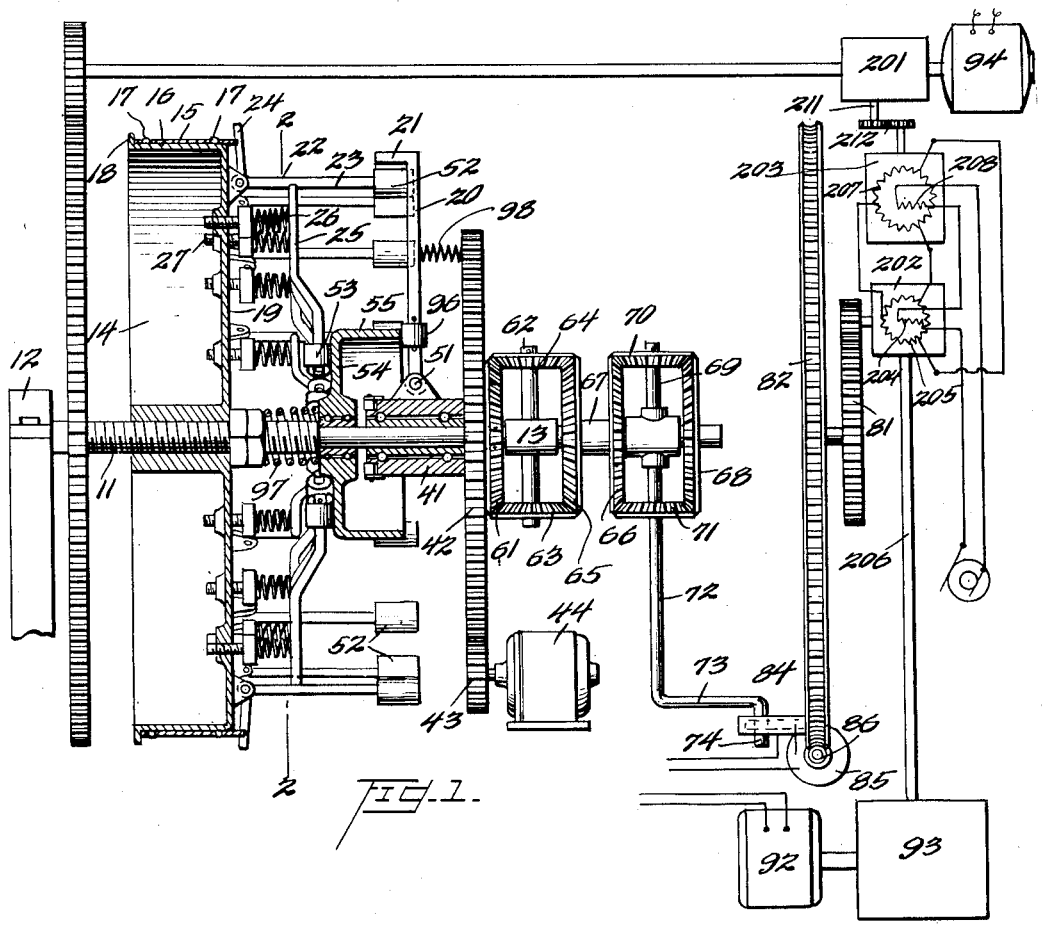
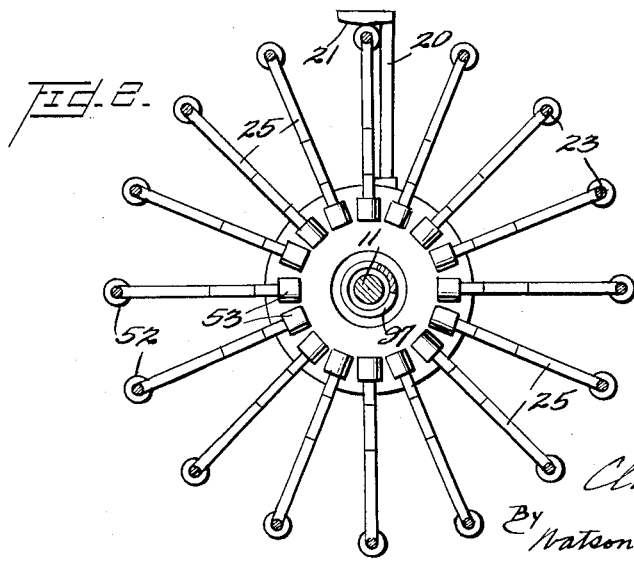
Inventor
Clarence H. Porter
By Watson, Coit, Morse & Grindle
Attorney Oct. 31, 1933.    C. H. PORTER    1,932,600
SOUND PICTURE PROJECTION
Filed July 31, 1929    3 Sheets-Sheet 2
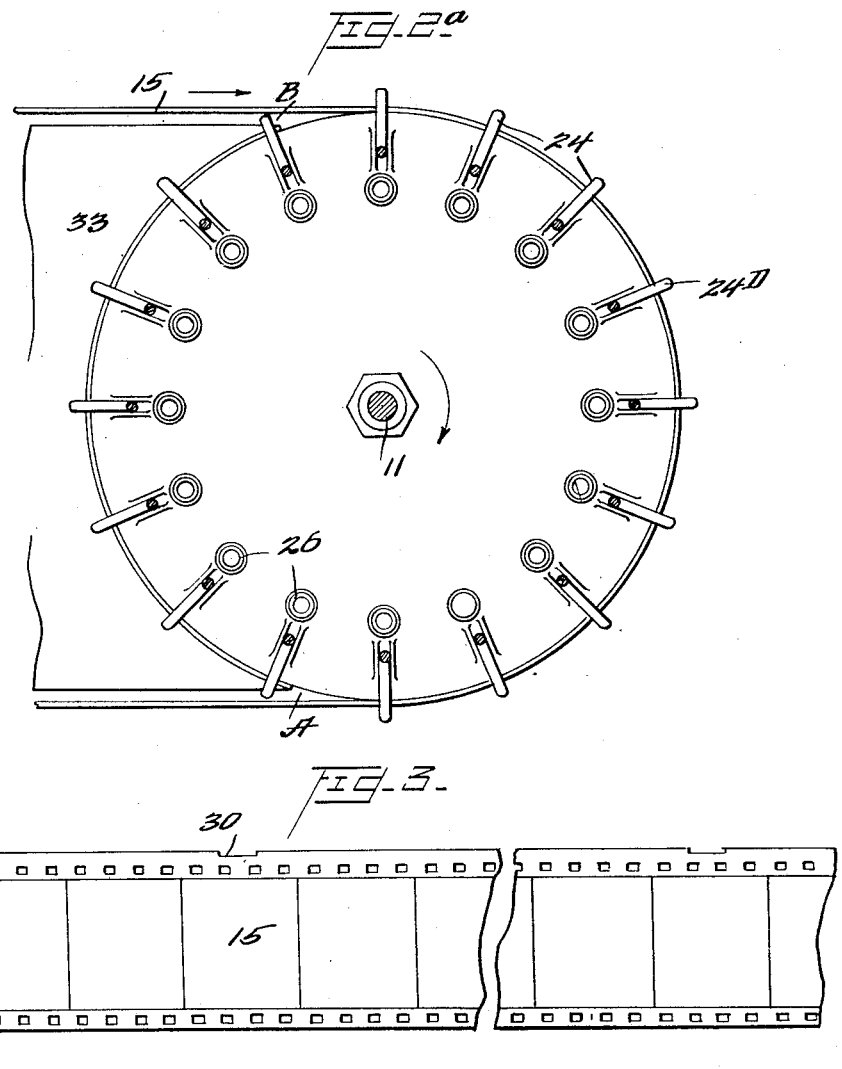

Oct. 31, 1933.  C. H. PORTER  1,932,600
SOUND PICTURE PROJECTION
Filed July 31, 1929   3 Sheets-Sheet 3
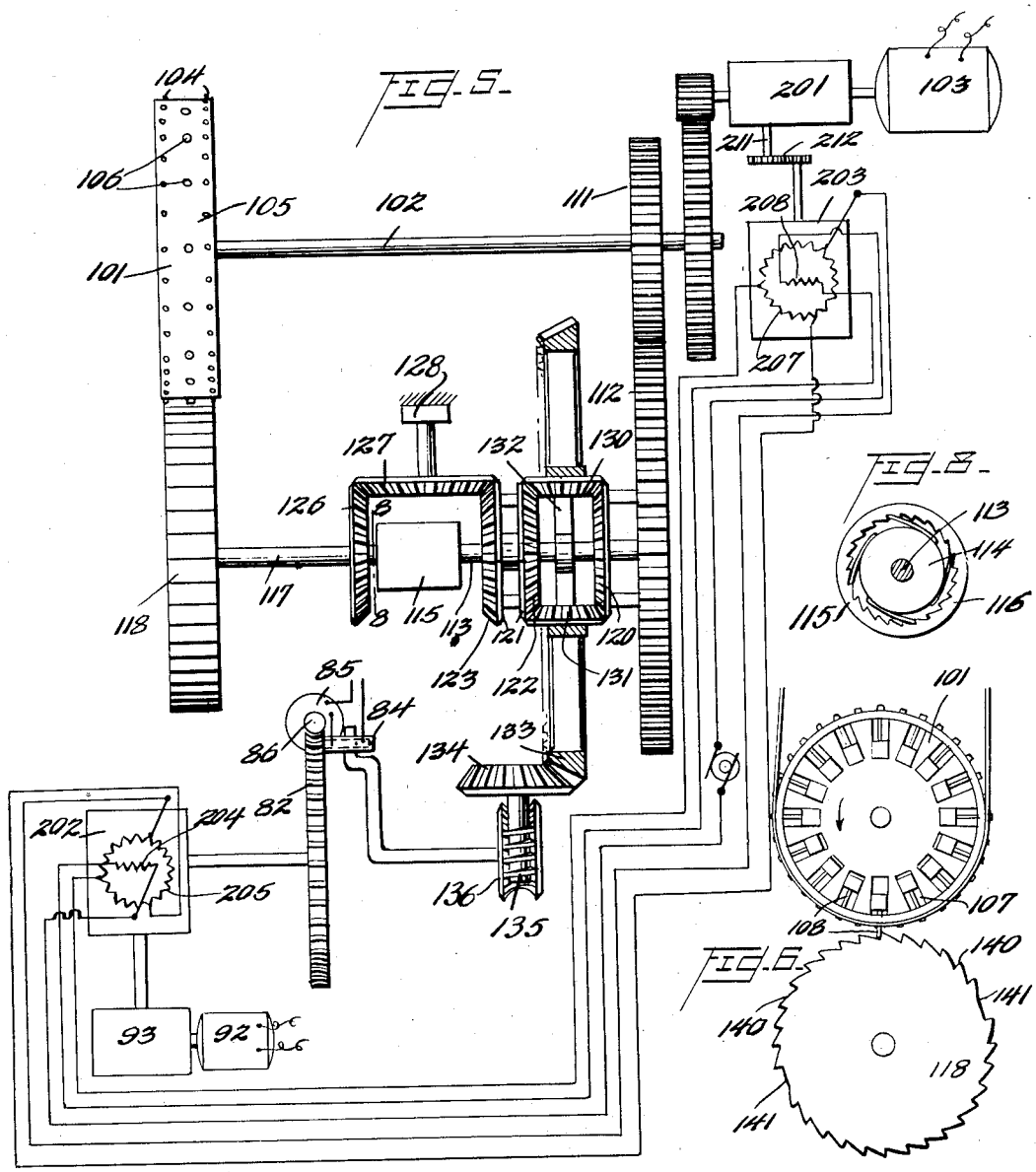
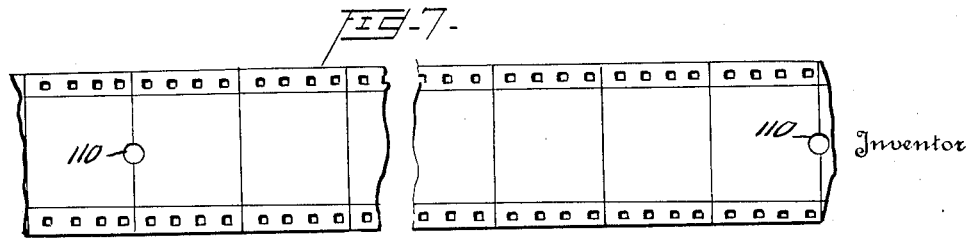
Inventor
Clarence H. Porter
By Watson Coit Moore & Bundle
Attorney Patented Oct. 31, 1933

1,932,600

UNITED STATES PATENT OFFICE 1,932,600

SOUND PICTURE PROJECTION

Clarence H. Porter, Washington, D. C.

Application July 31, 1929. Serial No. 382,477

7 Claims. (Cl. 88—16.2)

This invention relates to sound motion picture projection, and more particularly to mechanism for automatically resynchronizing the film and the sound record.

As is well known in the art a breakage of the film and a subsequent patching thereof shortens the film to some extent and causes the pictures to be projected slightly out of synchronism with the sound record. It has previously been proposed to resynchronize the film with the record by making perforations or notches in the film when a break occurs, and near the place where the film is patched and providing a resynchronizing mechanism which is controlled by the perforations or notches. That system has the disadvantage that it is necessary for the perforations or notches to be made manually and with some degree of care on the part of the operator, and the additional disadvantage that some time is lost in patching the film. By the present invention these disadvantages are entirely obviated and the film may be patched without the necessity of making any notches or perforations and in exactly the same manner as ordinary motion picture film used for silent projection.

According to the present invention synchronization of the film and the sound record is effected by means responsive to variations in the linear distance between spaced markings on the film which spaced markings are placed on the film in the course of its manufacture and which are originally at equal intervals. When the film becomes shortened by a break and subsequent patching, the two adjacent markings on either side of the patched section of the film will be closer together than when the film was manufactured. This change in relation between two adjacent markings on the film automatically operates the resynchronizing mechanism to bring the film and sound record into perfect synchronism.

It is therefore one object of this invention to provide a synchronizing mechanism which is controlled by the distance between spaced markings on the film. It is to be understood that the word "markings" is to be used in a very broad sense so as to include perforations, notches, visible indicia, blank spaces left in the film or any other distinguishing mark that can be placed at intervals on the film.

Another object of the invention is to provide a film having markings adapted to control a synchronizing device and placed at equal intervals on the film.

A further object of the invention is to provide a synchronizing device which will retard the feeding of the film in an amount proportional to the amount of shortening of the film between given points on the film.

Another object of the invention is to provide a synchronizing device which is immediately responsive to the passage of a shortened section of film, but in which the film is automatically and gradually brought into synchronization with the sound record without any sudden changes in the speed of the film.

The broad principles of this invention may be embodied in a number of different specific structures, two of which are described in the following specification. Each of these structures possesses certain definite advantages, and further objects of the invention will be apparent from the description and operation of the two embodiments of the invention described.

In the drawings, Figures 1 to 4 illustrate one embodiment of the invention, and Figures 5 to 8 illustrate an alternative form.

Figure 1 is a longitudinal view of the resynchronizing mechanism partly in section and in which the phonograph and film driving mechanism is also illustrated;

Figure 2 is a section taken on the line 2—2 of Figure 1 and looking toward the right;

Figure 2a is a section taken along the line 2—2 of Figure 1 and looking toward the left;

Figure 3 is a plan view of a strip of film adapted for use with the embodiment of the invention shown in Figures 1, 2, and 2a;

Figure 4 is a fragmentary view of the arm 20 and cam 21 illustrated in Figure 1;

Figure 5 is a longitudinal view partly in section of an alternative form of the invention;

Figure 6 is an end view of drum 101 and wheel 118 of this alternative form;

Figure 7 is a plan view of a strip of film adapted for use with the embodiment of the invention shown in Figures 5 and 6; and Figure 8 is a sectional view taken along the line 8—8 of Figure 5.

Referring to Figure 1, the numeral 11 denotes a shaft rotatably mounted in fixed bearings 12 and 13. Upon shaft 11 is mounted a drum 14 around which film 15 is fed on its way to the projecting lens of the motion picture machine.

Referring to Figure 2a it will be seen that the film 15 is in contact with the drum over slightly more than one-half the circumference of the drum. Drum 14 is provided on its circumferential surface 16 with a plurality of teeth 17 for engaging in the usual perforations of the motion picture film. In addition the circumferential surface 16 of the drum is provided at one edge with an out-turned flange 18 against which one edge of the film is adapted to rest.

The circumference of drum 14 in this embodiment of the invention is 16 times the length of one frame of a motion picture film. This ratio has been more or less arbitrarily selected in the design of this machine and it will readily be apparent that the circumference of the drum may be made larger or smaller than this, but should in any case be a multiple of the length of a frame of the picture film.

On the web 19 of the drum 14 are pivotally mounted sixteen levers 22 of a special form and arranged in a circular series adjacent the outer edge of the web of the drum. Each of these levers 22 consists of a horizontal member 23 pivotally mounted on the web 19, a substantially radially outwardly disposed member 24 preferably integral with the horizontal member 23, and a radially disposed member 25 also preferably integral with the horizontal member 23. Abutting against the member 25 is a small compression spring 26 tending to press the member 25 to the right as shown in Figure 1 and consequently to swing the horizontal member 23 outwardly and the radially disposed member 24 to the left. The compression of spring 26 may be adjusted by means of an adjustable screw socket 27 mounted on the web 19 of the drum.

Referring to Figure 2a the series of sixteen pivotally mounted levers is seen, each of which is provided with a radially outwardly disposed member 24 extending slightly beyond the periphery of the drum 14. The outer extremities of the sixteen members 24 are spaced apart a distance equal to the length of one picture frame and when the film is on the periphery of the drum, nine of the fingers 24 are pressed against the edge of the film by means of the compressive action of their respective springs 26.

Referring to Figure 3 which shows a strip of the film adapted for use with the present embodiment of the invention, it will be seen that the film is quite similar to ordinary motion picture film but is provided on one edge with shallow notches 30 spaced sixteen frames apart. It is evident that when this film is fed around the drum 14 one of the fingers 24 will, each revolution of the drum, tend to drop into the notch 30 of the film.

Referring to Figure 2a, 33 is a stationary guard member surrounding the drum on the side which is not in contact with the film. In Figure 2a the film and the drum are represented as travelling in the direction of the arrows shown. As each of the fingers reaches the point A it moves out of contact with the film and is supported by the upper surface of the guard 33 till it reaches the point B where it again comes in contact with the film and rests thereon. Rotatably mounted upon the shaft 11 and free to rotate relative thereto is a sleeve 41 carrying at its right end a gear wheel 42 which meshes with the pinion 43 of a very small electric motor 44 which tends constantly to rotate sleeve 41 at a greater speed than the rotation of drum 14 and shaft 11. Motor 44 is so designed that it may be permitted to stall and remain stationary with the current on. The arm 20 is hingedly mounted at 51 on sleeve 41 and projects radially outward in the path of the outer portions of arms 23.

Referring to Figure 4 it will be seen that the outer end of pivoted arm 20 is provided with a cam 21. Referring to Figure 1 it will be seen that each arm 23 is provided at its outer end with a roller 52. As shown in Figure 1 the outer portion of pivoted arm 20 is in engagement with the outer extremities of the roller 52 of one of the arms 23. Because of this fact arm 20 and consequently sleeve 41 are prevented from rotating at a faster rate than drum 14 upon which arm 23 is mounted.

Referring again to Figure 1 it will be seen that the inner extremity of each arm 25 is provided with a roller 53 bearing against the vertical surface 54 of a sleeve 55 which is free to slide laterally with respect to shaft 11.

Referring to Figure 2 it will be seen that only one of the arms 23 is engaged by the pivotally mounted arm 20 at any given time. Consequently each of the other arms 23 which are at the time opposite to the film 15 on the drum 14 are free to swing radially outward when their respective arms 24 fall into one of the notches 30 on the film. The particular arm 23 which is engaged by the pivoted arm 20 is prevented from swinging outwardly by the cam surface 21 of the arm 20.

As described above, shaft 11 upon which drum 14 is mounted extends continuously through the apparatus. Gear wheel 42 which is rigidly connected to sleeve 41, carries a bevel gear 61. A fixed yoke 62 which is non-rotatably mounted on stationary bearing 13 through which shaft 11 passes, carries oppositely disposed bevel gear wheels 63 and 64. Rotatably mounted upon shaft 11 and free to rotate with respect thereto are the two oppositely disposed bevel gear wheels 65 and 66 which are rigidly connected by a hollow sleeve 67 which surrounds shaft 11. Mounted rigidly upon shaft 11 is the bevel gear wheel 68 oppositely disposed with respect to bevel gear wheel 66. Between bevel gear wheels 66 and 68 and free to rotate about shaft 11 is the movable yoke indicated at 69 carrying the oppositely disposed bevel gear wheels 70 and 71 which mesh with the gear wheels 66 and 68. An arm 72 projects from the movable yoke 69 and is bent to provide a horizontal section 73 and a radially disposed section 74.

The purpose of this train of bevel gear wheels is to impart to the arm 72 a motion which will be proportional to any difference in speeds between the drum 14 and the pivoted arm 20. Ordinarily the drum 14 and the pivoted arm 20 will rotate at the same speed, consequently bevel gears 61 and 68 fixed rigidly to sleeve 41 and shaft 11 respectively, will rotate at the same rate. Bevel gear wheels 63 and 64 merely serve to reverse the rotation of bevel gear wheel 61, and since gear wheels 65 and 66 are rigidly connected, gear wheel 66 will rotate at the same speed as gear wheel 61 and also at the same speed as bevel gear wheel 68. As a result movable yoke 69 will remain stationary and hence arm 72 will not be rotated around the axis of shaft 11.

If, however, there is any difference in speed between drum 14 and pivoted arm 20 such difference in speed will result in a rotation of the movable yoke 69 and consequently of the arm 72.

The movable field 205 of the synchronizer transmitter 202 is connected through a suitable train of gears 81 to the large worm gear wheel 82. A worm gear 86 driven by a motor 85 tends to rotate the worm gear wheel 82, and consequently the field 205 is of a synchronizer transmitter 202. Mounted upon the face of the worm gear wheel 82 is the switch indicated at 84 connected by any suitable electrical connections (illustrated diagrammatically) to enable it to control the supply of current to motor 85. Switch 84 is of any suitable type which is normally biased to closed position but which is adapted to be opened when contacted by the radially projecting portion 74 of arm 72. Motor 85 will rotate worm gear wheel 82 and the field 205 of the synchronizer transmitter until switch 84 comes in contact with arm 74 and is opened thereby, whereupon the current will be shut off from motor 85 and the worm gear 82 and the field of the synchronizer transmitter will be held stationary.

The rotor 204 of the rotary field synchronizer transmitter 202 is rotated by a shaft connection indicated by the numeral 206 and driven by the phonograph 93. Phonograph 93 is provided with a driving motor 92 which is adapted to drive the phonograph at a constant speed; and hence rotor 204 of the synchronizer transmitter 202 is driven at a constant speed proportional to the speed of the phonograph.

A synchronizer receiver is indicated at 203. Receiver 203 is provided with a stator 207 connected respectively to movable field 205 of the transmitter.

Receiver 203 is also provided with a rotor 208 connected in series with a source of alternating current 210 and the rotor 204 of the transmitter.

The rotor of receiver 203 is connected through shafts and suitable gearing to the speed gear 201, hereinafter described. The operation of the transmitter 202 and receiver 203 is as follows. Ordinarily rotors 204 and 208 rotate at the same speed, but when movable field 205 of the transmitter is rotated by worm gear wheel 82, the speed of the receiver rotor 208 is retarded. When movable field 205 ceases to rotate, the two rotors 204 and 208 again rotate at the same speed. For a more extended description of the rotary field synchronizer and its operation, United States patents to Bristol 1,396,401, November 8, 1921, and Johnson 1,234,170, July 24, 1917, are referred to.

It is obvious that in the present invention, the apparatus of the two above mentioned patents need not be employed, but any other well known means for retarding the speed of the film when worm wheel 82 rotates may be substituted therefor.

Speed gear 201 is essentially a controller of the speed of the shaft which transmits power from the motor 94 to the film feeding mechanism. Speed gear 201 is preferably a fluid gear such as of the type disclosed in United States patent to Janney 1,220,424, March 27, 1917, being so designed that the full power is delivered by the same from motor 94 to the film feeding mechanism, but the velocity of rotation is controlled absolutely by the rotation of shaft 211 which is driven through gearing 212 by rotor 208. Shaft 25 of the Janney device corresponds to shaft 211 of the structure of the present invention. This form of speed gear and its connection, is described in United States patent to Bristol 1,396,401, November 8, 1921. It is obvious that shaft 211 may be connected to any other well known controlling means for controlling the speed of the film feeding mechanism, in lieu of speed gear 201. Or, shaft 211 may itself drive the film feeding mechanism.

Referring to Figure 1, it will be seen that motor 94, through speed gear 201, drives drum 14 through suitable gearing. Likewise motor 94 through speed gear 201 drives the remainder of the film feeding apparatus of the projector, which being of the usual type is not illustrated.

In operation the film 15 passes continuously over and around the drum 14. Assuming that one of the fingers 24 has dropped into a notch 30 in the film and that pivoted arm 20 has been rotated by motor 44 and the intermediate gearing to come in contact with the roller 52 at the outer extremity of the corresponding lever 23, it will be seen that the cam surface 21 at the extremity of arm 20 will force the roller 52 radially inward, swing the lever 22 about its pivot and remove the fingers 24 from the notch in the film. The drum 14 and the arm 20 will then rotate at the same speed.

In case the film has not been shortened, a notch 30 will present itself beneath the finger 24 of the lever 22 which is engaged by arm 20, at each revolution of the drum 14. But since lever 22 is held radially inward by means of the cam 21 this finger 24 will be unable to drop into the notch 30 of the film.

If, however, the film has been shortened, for example three frames, it is obvious that when the shortened section of the film passes over the drum 14 a notch 30 will present itself to the finger 24D which will then drop into the notch, due to the force of the spring 26 which is constantly pressing against the arm 25. Assuming this situation, the roller 53 which bears against the vertical surface 54 of the slidable sleeve 55 is thereby moved to the right in Figure 1 and carries the sleeve 55 to the right with it. Sleeve 55 bears against a roller 96 which is mounted on arm 20 and the movement of sleeve 55 to the right therefore causes the arm 20 to pivot to the right around its inner pivotal connection 51. As the arm 20 pivots to the right its outer extremity clears the end of the roller 52 with which it has previously been engaged, and the arm 20 is then free to be rotated by the motor 44 and train of gears 42 and 43 at a higher rate of speed than the drum 14.

This higher rate of speed causes a differential movement in the train of pivotal gears 66, 68, 70, and 71 and thereby causes arm 72 to slowly rotate. As soon as the outer extremity 74 of arm 72 goes out of contact with the switch 84, this switch 84 automatically closes, thereby allowing motor 85 to drive worm wheel 82 and the field of the rotary synchronizer. This rotation of the field of the rotary synchronizer retards the speed of the rotor of the receiving apparatus of the synchronizer, and hence retards the movement of speed gear 201 and the feeding of the film.

The arm 20 continues to revolve at a higher rate of speed than the drum 14 until it has advanced sufficiently with respect thereto for the cam 21 of the arm to engage the roller 52 of the lever 22 which carries the finger 24D that has dropped into the notch 30 of the film. As the cam 21 reaches this roller 52 the inner cam surface forces the roller 52 radially inward, moves the inner roller 53 of the arm to the left, and allows the spring 97 to return the sleeve 55 to the left. The arm 20 can then rotate at no faster speed than the drum 14, the differential action between the gears 66 and 68 ceases, and the arm 72 becomes stationary. Motor 85 continues to drive the worm gear wheel 82 until switch 84 again comes into contact with the outer extremity 74 of the arm 72 whereupon switch 84 opens and shuts off the motor 85. From thence on film driving mechanism is no longer retarded but runs at an even speed and in synchronism with the phonograph motor 92.

Referring to Figure 1 it will be seen that a small spring 98 is compressively mounted between pivoted arm 20 and gear wheel 42. When the cam surface 21 of the arm 20 moves the roller 52 and lever 22 radially inward and hence the roller 53 to the left in Figure 1 and allows the spring 97 to return the sleeve 55 to its normal position to the left, spring 96 forces pivoted arm 20 to the left and maintains the roller 96 in contact with the circular edge of sleeve 55. The effect of this is to cause the outer side surface of the pivoted arm 20 to engage the roller 52 which it would previously have cleared.

With respect to the film notch engaging means and the pivoted arm 20, the cycle of operations may be briefly reviewed as follows. In normal operation of the mechanism none of the fingers 24 drop into the notches 30 of the film since these notches 30 present themselves to the same finger 24 each revolution of the drum and since this particular finger 24 is restrained from dropping into a notch because of the engagement of its corresponding roller 52 by the pivoted arm 20 and cam 21. The arm 20 and drum 14 are then rotating at the same speed. When however, due to a shortening of the film a notch 30 presents itself to one of the other fingers 24, for example the finger 24D, that finger drops into the notch, its inner roller 53 moves the sleeve 55 to the right and pivots the arm 20 to the right thereby releasing the arm 20 from the roller with which it has been engaged. The arm 20 thereupon is free to clear the outer extremities of all the rollers 52 except that corresponding to finger 24D, and rotates relatively to the drum 14 until the cam surface 21 engages the roller 52 of the arm 24D. The inward motion of the roller 52 of the arm 24D permits the arm 20 to return to its normal position at the left and the roller 52 of finger 24D is then engaged at the side surface of the arm 20. It should be noted that in normal operation each of the rollers 52 is held radially inward as far as the inner portion of the cam surface 21 by the engagement of its corresponding finger 24 with the edge of the unnotched portion of the film or by engagement with the guard 33, or in the case of the finger 24 which is opposite a notch by the retaining action of the cam surface 21 of pivoted arm 20 which engage that particular roller 52.

In the alternate form of the invention illustrated in Figures 5 to 8, 101 represents a film driving drum, rigidly mounted on shaft 102 which is driven through a speed gear 201 (described in the first embodiment of the invention) by the motor 103. Drum 101 is provided with teeth 104 for engaging the usual sprocket openings in the film. The circumferential surface 105 of drum 101 is provided with spaced holes 106 spaced apart the length of one frame, and communicating with radially disposed cylindrical cavities 107 in the interior of the drum 101. In the cavities 107 are slidably mounted pins 108, each of which is adapted to be projected out from the circumferential surface of the drum 101 by gravity when it reaches a depending or downward position in the rotation of the drum 101.

For the purpose of illustration, the film is omitted in Figure 5, but it will be understood that the film surrounds approximately the lower half of the circumference of the drum 101. Referring to Figure 7, it will be seen that the film is of the usual type but is provided at equal intervals (for example, each sixteen frames) with perforations 110, preferably on the dividing line between frames. These perforations 110 are of several times larger diameter than pins 108, in order that as the film contacts with the lower half of the drum 101, the pin 108 that is opposite the perforation 110 will project therethrough. Figure 6 shows one of the pins 108 projecting through a perforation in the film. If desired, a magnet as in U. S. Patent 1,254,436 or springs and a cam as in U. S. Patent 1,461,298 may be employed to assist the pins 108 to project from the drum 101.

Mounted on shaft 102, is a gear wheel 111 meshing with and driving a gear wheel 112 of twice its diameter. Gear wheel 112 is mounted on shaft 113 which drives the inner member 114 of a ratchet clutch indicated generally by the numeral 115. The outer member 116 of ratchet clutch 115 is connected to a shaft 117 which drives the toothed wheel 118. Toothed wheel 118 is of the same diameter as drum 101, and it will be apparent that toothed wheel 118 rotates at half the velocity (both angular and peripheral) of drum 101. Toothed wheel 118 is normally driven through gear wheels 111, 112, shaft 113, ratchet clutch 115 and shaft 117, but due to the interposition of the ratchet clutch 115, may be moved ahead at a greater rate of speed than would be imparted by the gearing just described.

A bevel gear wheel 120 is rigidly mounted on shaft 113 and a double bevel gear wheel 121 having oppositely disposed toothed surfaces 122 and 123 is loosely mounted on suitable ball bearings coaxially with shaft 113. Rigidly mounted on shaft 117 is the bevel gear wheel 126 meshing with a bevel gear wheel 127 which turns freely on a fixed support 128. Bevel gear wheel 127 meshes with teeth 123 of gear wheel 121. The effect of the gearing just described is as follows. When shafts 113 and 117 are revolving, bevel gear wheels 120 and 121 are revolved in opposite directions. If shafts 113 and 117 are rotating at the same speed, as when shaft 113 is driving shaft 117 through ratchet clutch 115, bevel gear wheels 120 and 121 will revolve at equal speeds but in opposite directions. When, however shaft 117 is rotating at a greater speed than shaft 113, while overrunning the latter, bevel gear wheel 121 will revolve at a greater speed than bevel gear wheel 120.

Interposed between bevel gear wheels 120 and 121 is a differential gearing construction comprising the two bevel gear wheels 130 and 131 pivotally mounted on a yoke 132 which is mounted to freely turn relative to shaft 113. Mounted on yoke 132, to turn around shaft 113 therewith, is the large bevel gear wheel 133 connected by any suitable gearing such as the bevel gear wheel 134 to the worm 135. Worm 135 drives the worm wheel 136 which is adapted to operate a switch 84 to actuate a motor 85 to rotate the field 205 of the movable field synchronizer transmitter 202 as described in the first embodiment of the invention. The transmitter 202, receiver 203, speed gear 201, and associated parts are identical with the corresponding units in the first embodiment of the invention. A motor 92 and phonograph 93 are provided as in the first embodiment of the invention described above, and these units are connected as described above for that embodiment. The rotor of the receiver 203 of the rotary field synchronizer is connected by shafts and gearing to the speed gear 201 and controls the driving speed of the latter.

From the above description, it will be clear that while the shafts 113 and 117 are revolving at the same speed, the differential gearing construction will run idle, the yoke 132 remaining stationary, and the field of the rotary field synchronizer transmitter will remain stationary. When, however shaft 117 rotates at a greater speed than shaft 113, yoke 132 will rotate and cause a rotation of the rotary field of the synchronizer transmitter. As a result, speed gear 201 will be retarded and hence the film retarded with respect to the sound record which runs at a constant speed.

Referring to Figure 6, it will be seen that while drum 101 is provided with sixteen pins 108, toothed wheel 118 is provided with thirty teeth 140 and two blank spaces 141. Since toothed wheel 118 normally rotates at half the speed of drum 101, some one of the pins 108 of drum 101 will coincide with each of the blank spaces 141 during each revolution of the toothed wheel 118.

Toothed wheel 118 is mounted sufficiently close to drum 101 to enable any of the pins 108 that project therefrom to engage with a tooth on wheel 118, except when the pin is opposite one of the blank spaces 141. When a pin 108 engages with one of the teeth 140 it carries the tooth along with it through a short arc before disengaging. Since drum 101 travels at twice the normal speed of toothed wheel 118, the latter is accelerated and caused to rotate at twice its normal speed during the time a pin 108 is in contact with a tooth 140. It is obvious that after a given pin 108 has engaged teeth on wheel 118 one or more times, wheel 118 will have reached a position where a blank space 141 will present itself opposite to the given pin. Thereafter as the drum 101 and wheel 118 rotate, the pin will drop into each of the blank spaces 141 on each revolution of the drum 101. Each of the spaces 141 is long enough to enable a pin 108 to pass therethrough without engaging wheel 118. This is the normal running condition of the apparatus while the film and record are in synchronism.

Assuming that the film is rotating on drum 101, wheel 118 is rotating at half the speed of drum 101, and that a given pin 108 is dropping through a perforation in the film at every revolution of drum 101 and dropping into a blank space 141 each time, it will be apparent that the synchronism relative speed of the film and the sound record is not altered by this apparatus. All of the pins except this given pin will be retained within their respective cavities by the unperforated portions of the film. When, however, a section of the film which has been shortened passes over drum 101, a perforation will follow its preceding perforation by a distance less than sixteen frames. This causes a different pin 108 to be released and allowed to drop into engagement with a tooth 140 on wheel 118, since a blank space 141 will not yet have presented itself to the drum 101. Engagement of this pin with a tooth will cause an acceleration of wheel 118, and a forward movement thereof greater than normal. Each revolution of drum 101 will cause a further advance of toothed wheel 118, equal to one tooth, over its normal travel, until wheel 118 has been sufficiently advanced to bring a blank space 141 opposite the particular pin 108 which is dropping through each perforation 110 of the film each revolution of the drum 101.

By this means the wheel 118 will have been advanced a distance in its rotary travel proportional to the amount the film has been shortened between adjacent perforations. This advance of the toothed wheel 118 relative to its normal travel, or stated differently, relative to the rotation of shaft 113, acts through the differential gear mechanism, described above, to rotate the arm 72 through a certain arc, as in the first embodiment of the invention. Then, as described for the first embodiment of the invention switch 84 causes motor 85 to rotate worm wheel 82 through an equal arc, and thereby rotate the field of the rotary field synchronizer an amount proportional to the shortening of the film. This causes a retardation of speed gear 201, and of the film feeding mechanism.

When toothed wheel 118 has been advanced sufficiently with respect to drum 101 to bring one of the blank spaces 141 opposite the particular pin 108 which is dropping through each perforation, wheel 118 will cease to be driven by a pin 108 and will then rotate at its normal slower speed. The differential action between wheel 118 and shaft 113 ceases, arm 72 ceases to rotate, and as soon as switch 84 comes in contact with member 74 the current is shut off from the motor 85. The movable field 205 of the transmitter ceases to rotate, and thereafter the film feeding mechanism and the phonograph operate in synchronism.

Having thus described the invention, what is claimed as new and desired to be secured by Letters Patent is:

1. In combination, a sound reproducing device, a motor for driving said device, a motion picture projector including a movable film having spaced indicia thereon, a motor for driving said projector, a variable speed gear operatively connected between said last named motor and said projector, synchronizing mechanism operatively connected between said variable speed gear and said sound reproducing device, means moving at a speed proportional to the speed of said film, means normally moving at the same speed as said first named means, means controlled by said indicia on said film for changing the speed of said second named means, means responsive to the difference in the speed of said first and second named means for acting upon said synchronizing mechanism to restore synchronism between said sound device and said projector.

2. Motion picture apparatus having therein a motion picture film-feeding device, a phonograph, means for synchronously operating the film-feeding device and phonograph, a film including spaced indicia thereon, detecting means responsive to the distances between indicia on the film, and means controlled by said detecting means for retarding the film-feeding device in accordance with detected diminution in distance between indicia on the film.

3. Motion picture apparatus having therein a motion picture film-feeding device, a phonograph, means for synchronously operating the film-feeding device and phonograph, a film including spaced indicia thereon, means for detecting variation of indicia on the film from predetermined relative locations with respect to each other and means controlled by said detecting means for retarding the film-feeding device in accordance with detected variation of said indicia from predetermined relative locations.

4. Motion picture apparatus having therein a motion picture film-feeding device, a phonograph, means for synchronously operating the film-feeding device and phonograph, a film including spaced indicia thereon defining longitudinal sections of film, detecting means responsive to the lengths of sections between said indicia, and means, controlled by said detecting means, for retarding the film-feeding device in accordance with detected deficiency in length of a section of film between two indicia.

5. In combination, a motion picture projector, a phonograph, a film including spaced indicia thereon, detecting means responsive to the distances between indicia on the film, and means controlled by said detecting means for varying the ratio of the speeds of the film and the phonograph.

6. In combination, a motion picture projector, a phonograph, a film including spaced indicia thereon, detecting means responsive to the variation of indicia on the film from predetermined relative locations with respect to each other, and means controlled by said detecting means for varying the ratio of the speeds of the film and the phonograph.

7. In combination, a motion picture projector, a phonograph, a film demarked in its length into sections by indicia on the film, detecting means responsive to the lengths of said sections between indicia, and means controlled by said detecting means for varying the ratio of speeds of the film and sound reproducing device.

CLARENCE H. PORTER.